United States Patent Office 3,563,664
Patented Feb. 16, 1971

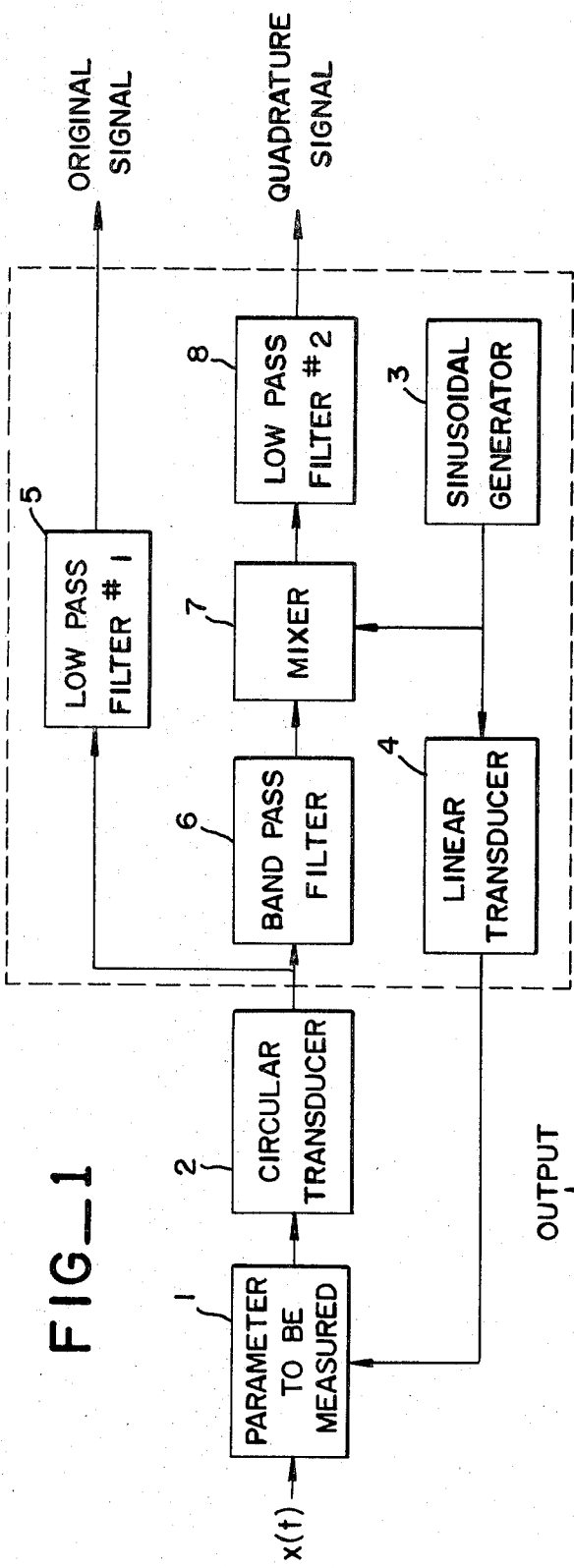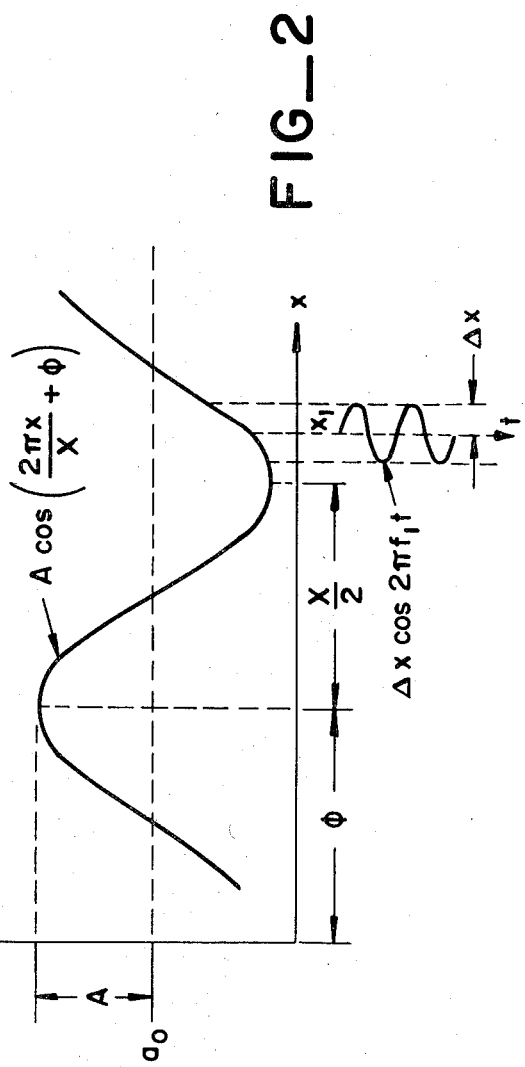

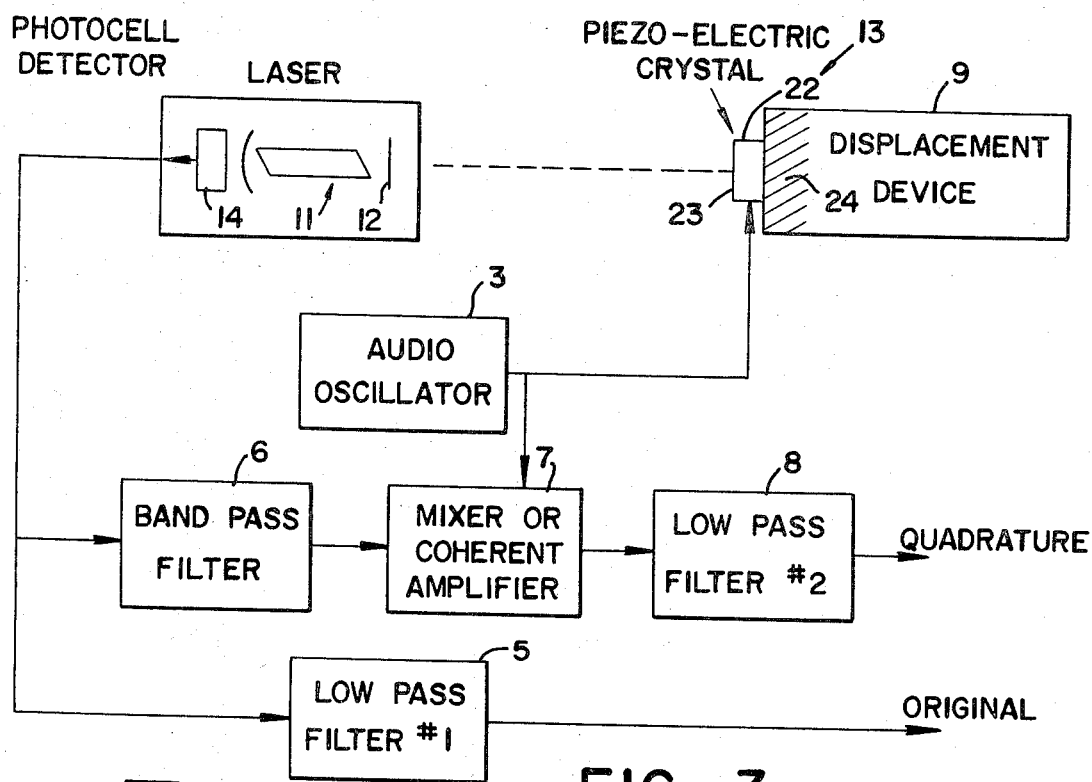
FIG_3
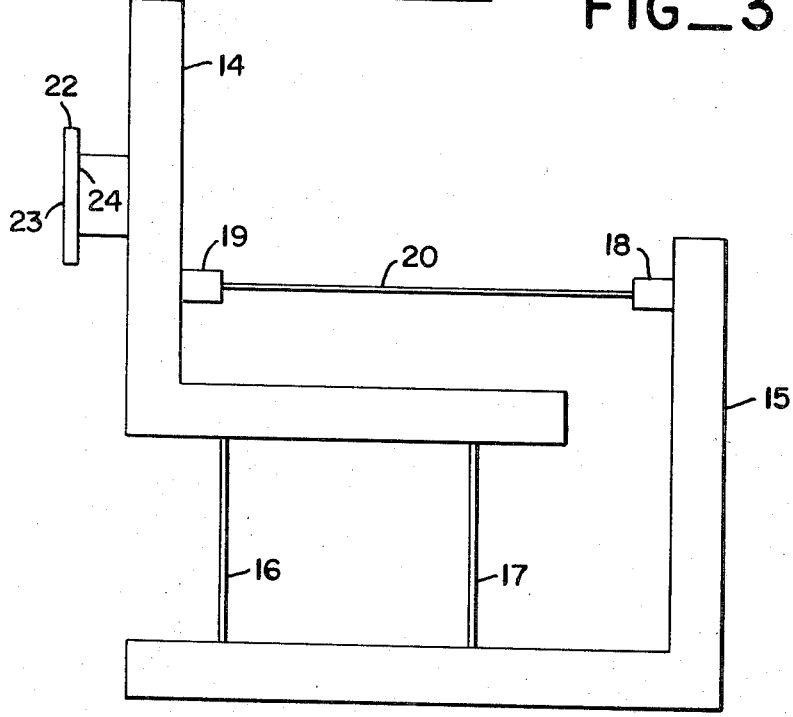
FIG_4

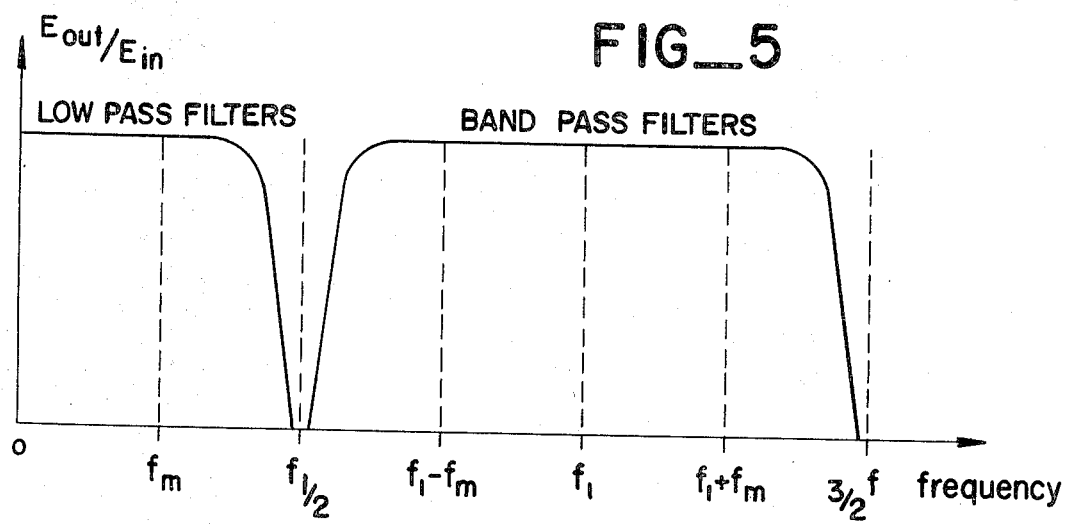
FIG_5
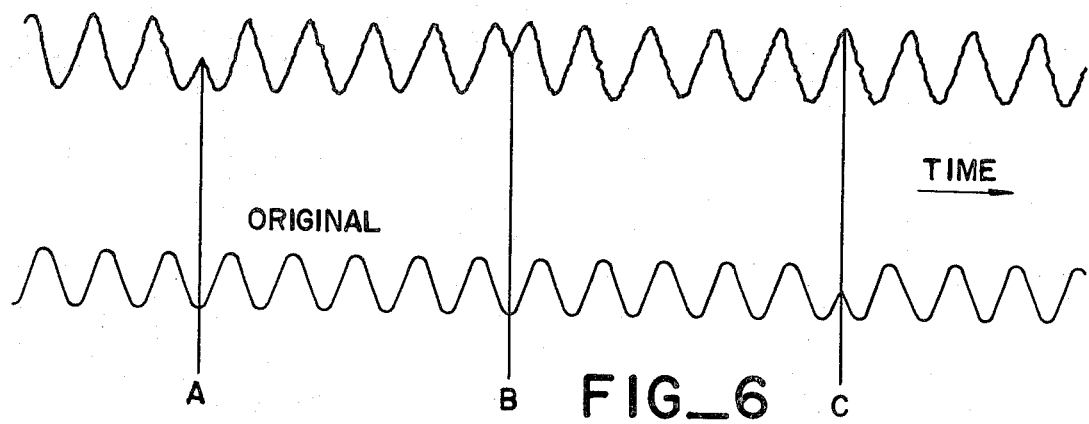
FIG_6
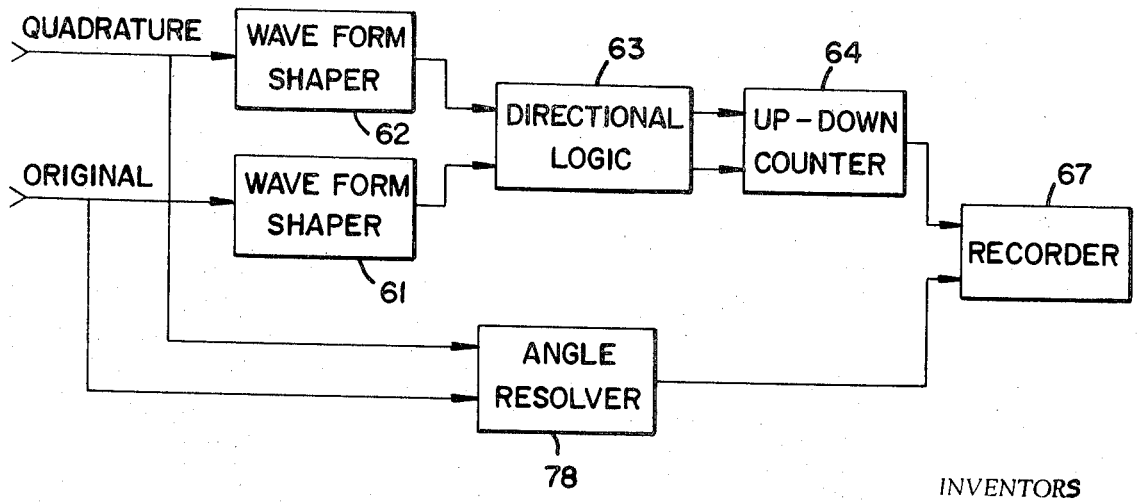
FIG_7

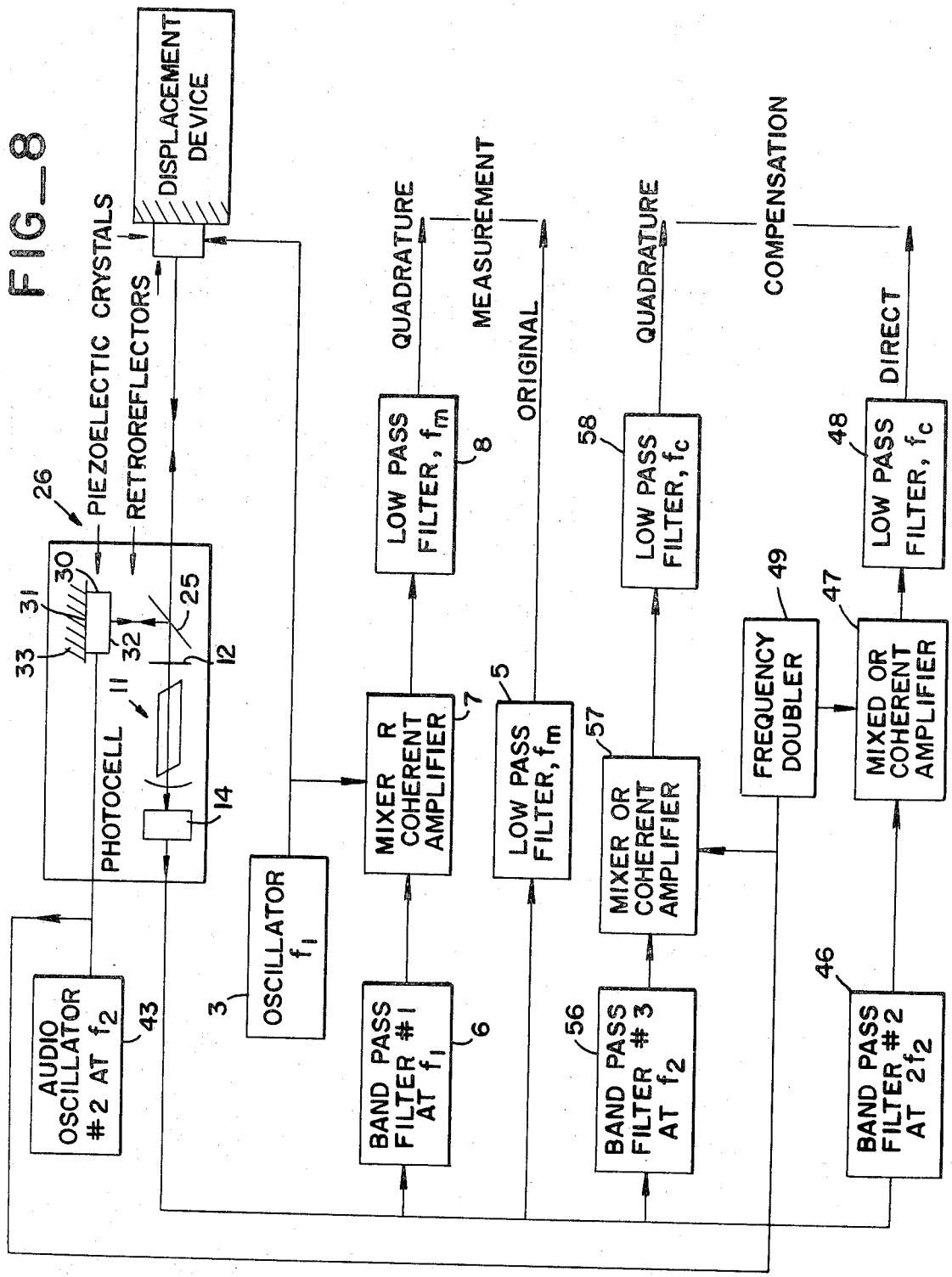

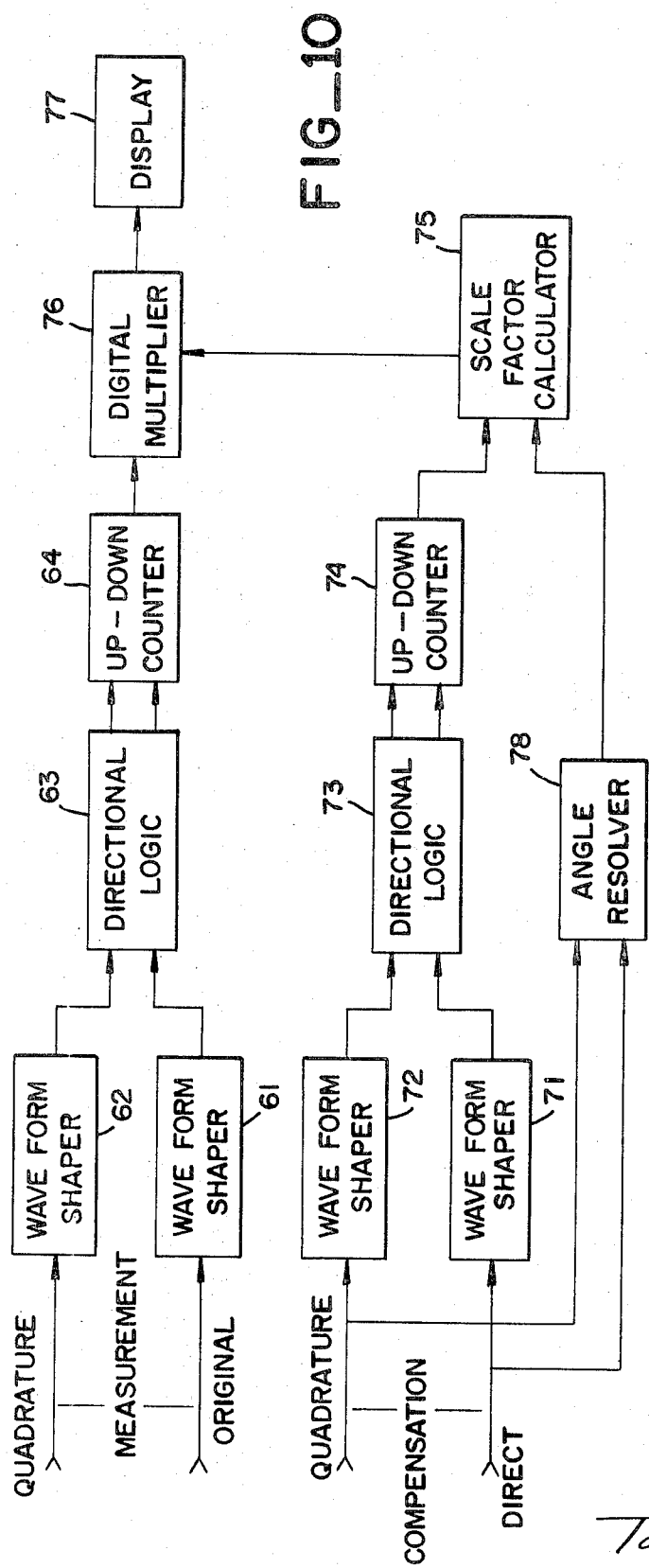
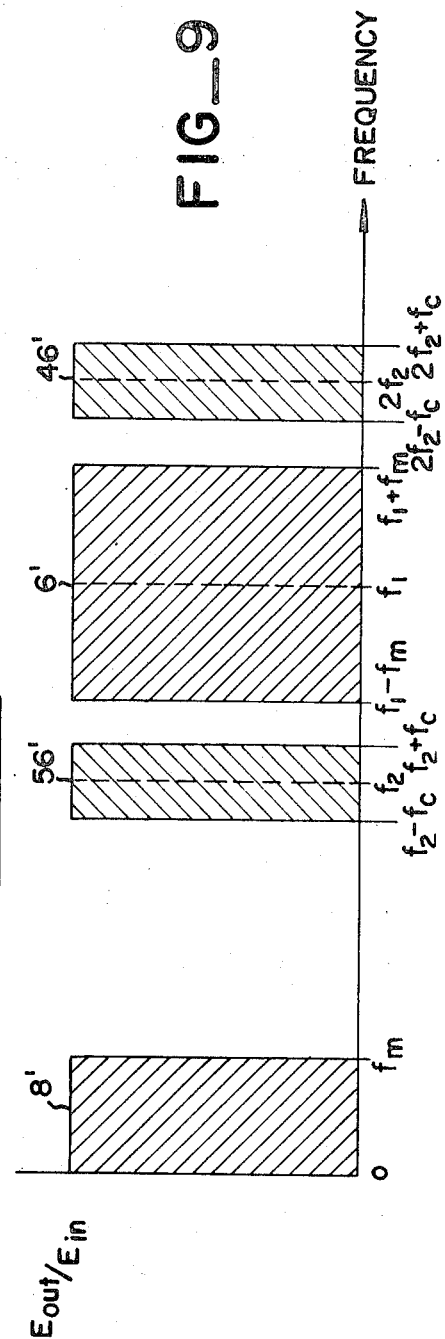

3,563,664
METHOD AND APPARATUS FOR RESOLVING TRANSDUCER AMBIGUITY
James W. Campbell, 1205 Madeira SE., Albuquerque, N. Mex. 87108, and Virgil Erbert, Albuquerque, N. Mex.; said Erbert assignor to said Campbell
Filed Nov. 9, 1967, Ser. No. 681,686
Int. Cl. G01b 9/02; H01s 3/00
U.S. Cl. 356—106                     10 Claims

ABSTRACT OF THE DISCLOSURE

A method and apparatus for resolving ambiguity in the output of circular function transducers by generating a signal in quadrature with the original transducer output is disclosed.

---

The invention described herein was made in the course of, or under, a contract with the United States Atomic Energy Commission.

This invention relates to a new and improved method and apparatus for generating a quadrature signal in the output of circular function transducers in order to resolve ambiguity in the transducer output.

A circular function transducer is an energy conversion device whose output is a substantially sinusoidal function of the input to the device. The sinusoidal nature of the output from such a transducer creates an ambiguity as to which of many possible input values produced any one output value. In particular, the output of such a device provides no information as to the direction of change of the input.

Circular function transducers are useful in certain areas of measurement where the input to the transducer corresponds to variation in a parameter to be measured, the periodic transducer output thereby providing a measurement of the variation. One of the most widely used circular function transducers are optical interferometers which produce intensity changes of light which are substantially sinusoidal functions of variations in the optical path length traveled by the interferometer light beams. Microwave interferometers are similarly circular function transducers. Because the optical path length depends upon the distance and the refractive index of the medium through which the beam travels, such transducers can be used to measure distances, densities, refractive indices, etc. with great accuracy.

Although it is possible to count the sinusoidal intensity changes, fringes, or cycles in the output of such interferometers, the output provides no information as to whether the input is increasing or decreasing. Thus, extraneous vibrations or variations in the optical path length may distort counting at the output without detection. Furhermore, within any one cycle, the output provides no information as to which side of a cycle a particular value belongs. Such directional information is at best extremely difficult to ascertain.

In the past, ambiguity in interferometers has been resolved with a quadrature system by construction in effect two interferometers with substantial duplication of equipment which simultaneously measure the optical path length of interest. The sinusoidal output of the second interferometer is mechanically phase shifted 90° from the sinusoidal output of the first interferometer. The two signals together provide the directional information necessary to resolve ambiguities in the output of the first interferometer. Thus, the sinusoidal output of the second interferometer will lead the sinusoidal output of the first interferometer by 90° for a variation in the parameter to be measured in one direction and will lag by 90° for a change in the parameter in the opposite direction. This conventional quadrature technique requires an independent and stable light source in order to provide the two different intensity interferometer beams. The two outputs (original and quadrature) have unique pair of values for every input over a range of one cycle.

The conventional quadrature system is inapplicable to the laser feedback interferometer (LFI) which can produce only a single intensity beam. In the laser feedback interferometer, the light intensity of the laser is determined by the amount of feedback of its own light from an external reflector. The net inphase contribution of the reflected light into the laser determines the output of the transducer. Thus, an additional feedback path as would be required in the conventional two interferometer quadrature system, would combine with other feedback paths to result in a single feedback function producing a single phase oscillation at the output of the laser. It is therefore, impossible to obtain the two intensity beams necessary for the conventional quadrature technique. Before the present invention there was no known technique for obtaining quadrature information from the output of the LFI.

Other circular function transducers such as the electro-optic Kerr Cell polarimeter also require some quadrature technique in order to resolve ambiguity.

It is an object of the present invention to provide a simplified and universally applicable method for obtaining quadrature information from circular function transducers by utilizing a single input and output of the transducer to obtain directional information in the output as to variations in the input. The invention thereby avoids substantial duplication of equipment and additionally may be carried out with commercially available electronic components.

In order to accomplish these results, the present invention contemplates modulating the input to a circular function transducer produced by a variation in the parameter to be measured. At the output of the transducer, the original output frequency component attributable to the variation in the parameter to be measured is separated from the modulating frequency component which contains the quadrature information. The invention further contemplates demodulating the modulating frequency component of the transducer output to obtain a signal in quadrature with the original output attributable to a variation in the parameter to be measured. The technique is thus applicable to the laser feedback interferometer where only the one laser beam intensity is available, and to other circular function transducers such as optical interferometers, polarimeters, spectrometers, photometers, electrometers, magnetometers and the laser ring gyro.

Another aspect of my invention contemplates applying this technique to provide a means for compensating interferometers for changes in the ambient atmosphere. In effect, two laser feedback interferometers are thereby provided from a single intensity laser source.

Other objects and advantages of the present invention will become apparent upon reading the following specification and referring to the accompanying drawings in which corresponding numerals represent corresponding parts in each of the several views.

In the drawings:

FIG. 1 is a block diagram of the apparatus and method for producing quadrature information in circular function transducers;

FIG. 2 is a graph illustrating the mathematical relationship between the original transducer output and the modulating signal;

FIG. 3 is a block diagram of the apparatus and method of the present invention as applied to a laser feedback interferometer;

FIG. 4 is a diagrammatical illustration showing one form of displacement device or carriage for use with the present invention;

FIG. 5 is a graph showing the characteristics of the low pass filters and band pass filters illustrated in FIG. 3;

FIG. 6 is a graph of experimental results showing the relationship between the original signal and the quadrature signal from the apparatus and method illustrated in FIG. 3;

FIG. 7 is a block diagram of data processing apparatus and method for the output signals from the apparatus and method illustrated in FIG. 3;

FIG. 8 is a block diagram showing the apparatus and method for additionally obtaining compensation information as applied to a laser feedback interferometer;

FIG. 9 is a graph showing the limiting characteristics of the low pass filters and band pass filters illustrated in FIG. 8; and FIG. 10 is a block diagram showing the data processing apparatus and method for the output signals from the apparatus and method illustrated in FIG. 8.

The embodiment of my invention illustrated in FIG. 1 is generally applicable to transducers to the type in which the input corresponds to a variation in a parameter to be measured and the output is a substantially sinusoidal function of the input for uniform variations in the input. The frequency of the sinusoidal output is proportional to the rate of change of the parameter to be measured. Thus, as illustrated in FIG. 2, a uniform variation of the input, $x$, along the horizontal axis corresponding to a uniform variation in the parameter to be measured produces a sinusoidal output, $F(x)$, defined by the following equation wherein $X$, $A$, $a_0$, and $\phi$ are constants of the particular transducer.

$$F(x) = a_0 + A \cos\left(\frac{2\pi x}{X} + \phi\right) \quad \text{[Equation 2]}$$

According to the present invention shown in FIG. 1, this input 1 to the circular transducer 2 corresponding to a variation in the parameter to be measured is modulated by a small periodic perturbation of frequency $f_1$ and amplitude $\Delta x$ as illustrated in FIG. 2. Thus, for any particular values $x_1$ of the input there will be a small variation about that point in the output whose value is a function of the time $t$ and the value $x_1$.

The transducer input is modulated by a sinusoidal generator 3 and a linear transducer 4 which converts the signal to a perturbation compatible with the input to the transducer, as illustrated in FIG. 1.

The output from the circular transducer thus becomes a function of both the uniform variation of the input $x$, and the time $t$, i.e., $F(x, t)$, and is defined by the following equation which is the classical phase modulation equation of communication theory.

$$F(x, t) = a_0 + A \cos\left(\frac{2\pi x}{X} + \phi + \frac{2\pi \Delta x}{X} \cos 2\pi f_1 t\right)$$

[Equation 2]

This expression can be expanded to the following more relevant form.

$$F(x, t) = a_0 + A J_0\left(\frac{2\pi \Delta x}{X}\right) \cos\left(\frac{2\pi x}{X} + \phi\right)$$
$$- 2A J_1\left(\frac{2\pi \Delta x}{X}\right) \sin\left(\frac{2\pi x}{X} + \phi\right) \cos 2\pi f_1 t$$
$$+ Re\left[2A e^{i\left(\frac{2\pi x}{X} + \phi\right)} \sum_{m=2}^{\infty} i^m J_m\left(\frac{2\pi \Delta x}{X}\right) \cos m 2\pi f_1 \right]$$

[Equation 3]

The first two terms to the right of the equal sign are the same as Equation 1 with the factor $A$ multiplied by a constant $$J_0\left(\frac{2\pi \Delta x}{X}\right)$$

$\Delta x$ ano $X$ being constants and $J_0$ being the zero order Bessell function of the first kind. These two terms represent the original circular transducer output corresponding to a variation in the parameter to be measured, with a frequency proportional to the rate of change in the parameter to be measured.

The third term is a component of frequency $f_1$ the modulating frequency. The amplitude of the $f_1$ frequency component is $$-2A J_1\left(\frac{2\pi \Delta x}{X}\right) \sin\left(\frac{2\pi x}{X} + \phi\right)$$

which is in quadrature with the original output component for the parameter $x$. That is, it is 90° out of phase with the original output component and in combination therewith would provide the necessary directional information about the input. It is thus seen that the original output component and the amplitude function of the $f_1$ frequency component together uniquely define the output for a variation in the input within the range of $X$. In other words, the two outputs (original and quadrature) have a unique pair of values for every input over a range of one cycle.

Accordingly, as illustrated in FIG. 1, the output from the circular transducer 2 is coupled to a first low pass filter 5 and a band pass filter 6. The first low pass filter has an upper cutoff frequency at approximately the maximum frequency $f_m$ of the original output due to the rate of change in the parameter to be measured. The output from this filter is the original signal. The band pass filter has a frequency range around the modulating frequency $f_1$ in order to separate out the third term in Equation No. 3 which contains the quadrature information in its amplitude function. The band pass is approximately from $f_1 - f_m$ to $f_1 + f_m$ in order to preserve this quadrature information. The output from the band pass filter may then be demodulated to obtain a signal corresponding to the amplitude function which is in quadrature with the original signal.

The $f_1$ frequency component is demodulated to obtain the amplitude function by coupling the output from the band pass filter to a mixer or multiplier 7 which multiplies the $f_1$ frequency component with the output from the sinusoidal generator 3 which is the same frequency and the same phase. If a difference in phase exists between the signals being multiplied, a phase shifter must be connected between the sinusoidal generator 3 and mixer 7 to appropriately adjust the phase so that the two phases are the same. The frequency multiplier produces two signals of approximately zero frequency and approximately twice the modulating frequency, $f_1$, each having the amplitude of the $f_1$ frequency component which is the function in quadrature with the original signal. A second low pass filter 8, with an upper cutoff frequency of approximately $f_m$, selects the signal of approximately zero frequency and extracts the amplitude information to produce the quadrature signal.

Referring back to Equation No. 3, $$J_0\left(\frac{2\pi \Delta x}{X}\right)$$

in the second term $$J_1\left(\frac{2\pi \Delta x}{X}\right)$$

in the third term and $$J_m\left(\frac{2\pi \Delta x}{X}\right)$$

in the fourth term are the first kind Bessel functions of zero order, first order and higher order respectively, and are constants for fixed $\Delta x$ and $X$. Thus, $\Delta x$, the amplitude of the modulating signal must be chosen so that $$\frac{2\pi \Delta x}{X}$$

is not a root of either the zero order or the first order Bessel function. If that were so, either of the Bessel functions would be zero, thereby eliminating either the original output signal or the $f_1$ frequency component which includes the quadrature information. Advantageously $\Delta x$ may be chosen so that the amplitudes of the two quadrature signals are equal as when $\Delta x$ is approximately equal to .142X. $\Delta x$ may also be chosen so that $$\frac{2\pi \Delta x}{X}$$

is a root of higher order Bessel functions to thereby eliminate undesirable harmonics.

The fourth term in Equation No. 3 contains all the harmonics of the original output frequency produced by the rate of change in the parameter to be measured and the modulating frequency $f_1$. In order for the frequency component $f_m$ attributable to the rate of change in the parameter to be measured, the modulating frequency, $f_1$, component and additional harmonics at the output of the circular function transducer may be separable by simple filtering, it is apparent that $f_1$ should be at least twice as great as $f_m$. This is because the band pass filter 6 at $f_1$ must pass frequencies from $f_1-f_m$ to $f_1+f_m$ in order to preserve the quadrature information in the $f_1$ frequency component as illustrated in FIG. 5. From a practical standpoint, $f_1$ must be somewhat greater than $2f_m$ to allow for non-ideal cutoff characteristics of the filters. These conditions satisfied, each term in Equation 3 occurs in a different frequency range and is easily separated by simple filtering. Further analysis of the Equation 3 reveals that in order to eliminate undesirable harmonics of $f_m$ and $f_1$, the band pass filter should have an upper cutoff frequency no greater than three-halves $f_1$.

To summarize the requirements for simple filtering, the low pass filter 5 should have the following characteristics:

$$f_m < \text{upper cutoff frequency} \leqslant \tfrac{1}{2} f_1$$

The band pass filter 6 should have the following characteristics:

$$\tfrac{1}{2} f_1 \leqslant \text{lower cutoff frequency} < f_1 - f_m$$
$$f_1 + f_m < \text{upper cutoff frequency} \leqslant \tfrac{3}{2} f_1$$

Finally, $f_1$ should be greater than or equal to twice $f_m$.

The method herein described for generating quadrature information is more generally applicable beyond circular function transducers, with some modification, to any transducers having a characteristic function with a bounded first derivative.

FIG. 3 illustrates schematically a laser feedback interferometer (LFI) of the type which may be obtained commercially comprising a laser medium or cavity 11, a partially transmitting output mirror 12 at one end of the cavity 11, external reflector 13 outward of the cavity 11 from mirror 12, and photodetector 14 positioned outward of the cavity 11 at the end opposite reflector 13. Such a system constitutes a circular function transducer in which the input, $x$, is a variation in the optical path length between the output mirror 12 and external reflector or retro-reflector 13 corresponding to a variation in the parameter to be measured. The output from the photocell detector 14 is a substantially sinusoidal function of uniform variations in the parameter to be measured, and the output signal frequency is proportional to the rate of change of the parameter to be measured.

The parameter to be measured could be the distance between the output mirror and the retro-reflector or it could be the refractive index of a medium placed between the output mirror and the retro-reflector or any parameter which produces a corresponding variation in the optical path length between the output mirror and retro-reflector. In the case where a distance or length is to be measured, the retro-reflector 13 is mounted on a suitable displacement device 9, one form of which is illustrated in FIG. 4. The displacement device includes a carriage 14 mounted on a stationary base plate 15 by steel spring strips 16 and 17. The two steel strips which form the support between the translating carriage 14 and the stationary base plate 15 are sufficiently rigid to hold the carriage 14 without significant sagging but are flexible enough to permit small motions of the carriage forward and backward relative to the base plate. The two metal strips 16 and 17 constrain the carriage 14 to maintain a constant angular relation with the base 15. Consequently, for small motions as are required in the instant use to which the carriage is to be put, the motion of the carriage has essentially no rotation.

To eliminate undesired vibrations the optical components and carriage may be placed on a vibration-absorbing material. The optical system may be isolated from air turbulence by enclosure in a transparent plastic box or other suitable enclosure.

Mounted between the carriage and base plate by suitable insulators 18 and 19 is a wire 20 whose expansion and contraction is to be measured as a result of increasing or decreasing current passing through the wire. Thus, the input $x$ to the LFI as a circular function transducer is a variation in the distance between the output mirror and retro-reflector corresponding to a variation in the parameter to be measured. A suitable carriage and displacement device upon which the retro-reflector may be mounted for more generalized spatial measurements is described in U.S. Pat. No. 2,604,004 issued to Root in 1952.

According to the present invention, the input $x$ to the LFI is modulated by a small periodic perturbation of amplitude $\Delta x$ and frequency $f_1$. The modulation may be accomplished by a variation of the index of refraction in the optical path, or a variation of the index of refraction in the optical path, or a variation in the distance between the output mirror and external reflector by vibrations of the output mirror, external reflector, rear vacity mirror or the entire laser cavity. A variation of the index of refraction in any portion of the optical path between the output mirror and retro-reflector can be easily produced by the electro-optic Pockel's Effect or by actually changing the density of a region. The Pockel's Effect, whereby the index of refraction varies as a linear function of an electric field, may be utilized by inserting a potassium dihydrogen phosphate (KDP) crystal or similar material into a portion of the optical path and applying a periodic voltage to it. The technique of varying the density may be achieved by placing a confined quantity of compressible gas in the optical path and applying a periodic pressure.

In the present illustration modulation of the input is accomplished by varying the distance between the output mirror and retro-reflector by vibrating the retro-reflector in the direction of the optical path and at a predetermined modulating frequency. To accomplish this a quartz crystal 22 with vapor-deposited gold faces 23 and 24 is mounted on the displacement device with the gold surfaces normal to the optical path. The gold surface 23 which is not attached to the displacement device serves as the retro-reflector for the LFI. As illustrated in the block diagram in FIG. 3, the desired periodic variation of the optical path length is produced by applying the output of an audio oscillator 3' to the two gold faces 23 and 24 of quartz crystal 22. The application of a periodic voltage to the two faces causes a periodic contraction and expansion of the crystal in the direction of the optical path. Gold surface 24 is firmly attached to the massive carriage of the displacement device and the other surface 23 is free to oscillate. The crystal's contraction and expansion at the predetermined modulating frequency $f_1$ and amplitude $\Delta x$ causes the retro-reflector to move periodically along the optically along the optical path of the LFI. The quartz crystal thus serves the purpose of the linear transducer shown in FIG. 1. The variations in the optical path length appear in the laser as changes in light intensity transformed to frequency components in the output of the photocell detector.

The output from the photocell detector is coupled to a band pass filter 6 and first low pass filter 5 of characteristics already described. Namely, the low pass filter 5 has an upper cutoff frequency at the maximum frequency $f_m$ of the original output produced by variations in the parameter to be measured. The band pass filter centers around the modulating frequency $f_1$ with a lower cutoff frequency less than approximately $f_1-f_m$ and an upper cutoff frequency greater than approximately $f_1+f_m$ in order to preserve the quadrature information in the amplitude function of the $f_1$ frequency component.

The output of the band pass filter 6 to coupled to a mixer or multiplier 7 which multiplies the $f_1$ frequency component with the output of the audio oscillator 3'. The audio oscillator signal must be in phase with the $f_1$ frequency component and if it is not, a suitable phase shifter can be incorporated between the audio oscillator and multiplier. The output of the mixer is the sum and difference of the frequencies in the inputs. Thus, the amplitude of the $f_1$ frequency component appears as identical amplitudes on a zero frequency or DC signal and a signal at $2f_1$. The second low pass filter 8 at the mixer output having an upper cutoff frequency at approximately $f_m$ passes the portion of the mixer output near zero frequency. The amplitude function is thereby extracted to produce a signal in quadrature with the original output signal obtained from the first low pass filter. The characteristics of the band pass filter 6 and the low pass filters 5 and 8 are chosen to meet the conditions already discussed and illustrated in FIG. 5.

Demodulation and detection of the amplitude function of the $f_1$ frequency component which contains the quadrature information may be carried out by a commercial "lock-in" amplifier which includes as components the band pass filter, mixer, low pass filter and phase shifter necessary for processing the quadrature information.

The quadrature signal and the original signal obtained from the two low pass filters may be fed into a dual channel chart recorder to graphically present the signals as illustrated in FIG. 6. In the experimental result illustrated in FIG. 6, the wire 20 was first heated so that the distance between the output mirror and retro-reflector was decreasing prior to A. During that time the quadrature signal was leading the original signal by 90°. At A, upon cooling the wire, the distance began increasing, and although the change of direction is not apparent in the original signal, it is indicated in the quadrature signal which then lags behind the original signal by 90°. At point B the direction of the carriage was reversed a second time and again the change in direction is apparent from the quadrature signal. The quadrature signal again leads the original signal by 90° A third reversal at point C is apparent in the original signal but not in the quadrature signal. Thus, the quadrature signal and original signal in combination at all points provide the necessary directional information to resolve any ambiguity in the output.

Alternatively, the original signal and quadrature signal may be connected separately to the vertical and horizontal deflection plates of an oscilloscope to obtain an ellipse or circle and the directional information obtained from the direction of rotation of the oscilloscope spot.

As shown in a portion of FIG. 7, the original signal and quadrature signal could also be connected to the inputs of and up-down or reversible counter 64 through suitable wave form shaping circuits 61 and 62 and a directional logic circuit 63 to obtain addition of cycles produced by variation of the parameter to be measured in one direction and subtraction of cycles produced by variation or motion of the parameter to be measured in the opposite direction. The output of the up-down counter may then be recorded or displayed at 67. Such circuits for wave form shaping, directional logic, and up-down or reversible counting and recording are well known and are described in U.S. Pat. No. 2,604,004 issued to Root in 1952 and in an article by Peck and Obetz in vol. 43, No. 6, of the Journal of the Optical Society of America, p. 505, 1953.

In the circuitry and apparatus described, amplifiers may be necessary at various points such as at the output of the photocell detector, depending upon the equipment used.

The quadrature technique heretofore described can also be used to provide compensation information in interferometers in order to correct for variations in the index refraction of the ambient atmosphere thereby permitting greater accuracy and higher resolution. As applied to the LPI illustrated in FIG. 8, a beam splitter 25 is placed in the optical path between the laser output mirror and retro-reflector. The beam splitter deflects a portion of the laser beam to a second retroreflector 26. To detect and compensate for variations in the atmospheric conditions, the physical length of the deflected compensation beam must be held constant by extremely low coefficient of expansion materials, such as Invar.

According to this aspect of the invention, a second piezoelectric crystal such as a quartz crystal 30 with gold surfaces 31 and 32 is mounted on the material 33 of low coefficient of expansion which defines the deflected compensation beam path length. Gold surface 32 is normal to the deflected compensation beam path and acts as the second external reflector or retro-reflector. Variations in the refractive index of the ambient atmosphere produces a corresponding variation in the optical path length of the deflected compensation beam thereby producing a direct signal in the photocell, output which is a sinusoidal function of the variation in the refractive index of the ambient atmosphere whose frequency is proportional to the rate of change of the refractive index.

As in the quadrature technique already described, the deflected compensation beam is modulated to provide directional information as to the variations in the ambient atmosphere. To this end a second audio oscillator 43 applies a small periodic voltage to the gold surfaces of second quartz crystal 30 of frequency $f_2$ thereby providing a periodic variation in the optical path length of the deflected compensation beam thereby modulating the beam at the predetermined modulating frequency $f_2$. The components utilized in parameter measurement are the same as in FIG. 3 heretofore described. The LFI output $G(y, t)$ attributable to the variations of the refractive index in the ambient atmosphere and the compensation beam modulation at frequency $f_2$ is given by the following equation where $y$ is the refractive index times the compensation path length, $\Delta y$ is the amplitude of the compensation beam modulating signal, X is half the operating wavelength of the laser, and B is a scale factor, proportional to the amount of feedback in the compensation beam.

$$G(y, t) = B \cos \frac{2\pi}{X} (y + \Delta y \cos 2\pi f_2 t)$$

[Equation 4]

This expression can be expanded to a more relevant form.

$$G(y, t) = BJ_0\left(\frac{2\pi \Delta y}{X}\right) \cos \frac{2\pi y}{X}$$
$$- 2BJ_1\left(\frac{2\pi \Delta y}{X}\right) \sin \frac{2\pi y}{X} \cos 2\pi f_2 t$$
$$- 2BJ_2\left(\frac{2\pi \Delta y}{X}\right) \cos \frac{2\pi y}{X} \cos 4\pi f_2 t$$

[Equation 5—Continued, col. 9]

$$+ Re\left[ 2Be^{i\left\{\frac{2\pi y}{X}\right\}} \sum_{n=3}^{\infty} i^n J_n\left(\frac{2\pi \Delta y}{X}\right) \cos 2n\pi f_2 t \right]$$

[Equation 5]

Thus the total LFI output $F(x, t)+G(y, t)$ attributable to variations in the ambient atmosphere, variations in the parameter to be measured, and the two modulating signals is the sum of Equation No. 3 and Equation No. 5, where $a_0$ is the average intensity of the laser output and A is a scale factor proportional to the amount of feedback in the measurement beam.

$$F(x, t)+G(y, t) = a_0 + AJ_0\left(\frac{2\pi \Delta x}{X}\right)\cos\frac{2\pi x}{X}$$

$$+ BJ_0\left(\frac{2\pi \Delta y}{X}\right)\cos\frac{2\pi y}{X}$$

$$- 2AJ_1\left(\frac{2\pi \Delta x}{X}\right)\sin\frac{2\pi x}{X}\cos 2\pi f_1 t$$

$$- 2BJ_1\left(\frac{2\pi \Delta y}{X}\right)\sin\frac{2\pi y}{X}\cos 2\pi f_2 t$$

$$- 2BJ_2\left(\frac{2\pi \Delta y}{X}\right)\cos\frac{2\pi y}{X}\cos 4\pi f_2 t$$

$$+ Re\left[ 2Ae^{i\left\{\frac{2\pi x}{X}\right\}} \sum_{m=2}^{\infty} i^m J_m\left(\frac{2\pi \Delta x}{X}\right) \cos 2m\pi f_1 t \right.$$

$$\left. + 2Be^{i\left\{\frac{2\pi y}{X}\right\}} \sum_{n=3}^{\infty} i^n J_n\left(\frac{2\pi \Delta y}{X}\right) \cos 2n\pi f_2 t \right]$$

[Equation 6]

The frequency component $f_c$ due to changes in the index of refraction of the ambient atmosphere is of a long period and, therefore, in the frequency range of the original output produced by variations of the parameter to be measured. In order to avoid interference between $f_c$ and $f_m$, the $f_c$ component in the laser output may be initially eliminated and information as to $f_c$ obtained from the amplitude function of a higher frequency component in the output. Thus the term $$BJ_0\left(\frac{2\pi \Delta y}{X}\right)\cos\frac{2\pi y}{X}$$

may be eliminated by making $\Delta y$ such that $$\frac{2\pi \Delta y}{X}$$

is a root of the zero order Bessel function $J_0$. This eliminates the third term to the right of the $=$ sign in Equation No. 6, and information as to $f_c$ component must be obtained from the sixth term of Equation No. 6 where it is contained in the amplitude function of the $2f_2$ frequency component. Thus, the second and fourth terms of the Equation No. 6 contains the parameter measurement beam information while the fifth and sixth terms of the Equation No. 6 contain the index of refraction compensation beam information.

The parameter measurement beam information obtained in the $f_m$ and $f_1$ frequency components of the LFI output are processed as illustrated in FIG. 3 heretofore described to obtain an original signal and the signal in quadrature therewith which provide measurement information of the parameter to be measured.

The $f_2$ and $2f_2$ frequency components of the LFI output which contain the compensation beam information are processed as follows. The $2f_2$ frequency component has as an amplitude function the original $f_c$ information attributable to variations in the refractive index of the ambient atmosphere. Thus, the $2f_2$ frequency component is separated by a second band pass filter 46 having a frequency range of approximately $2f_2-f_c$ to $2f_2+f_c$ in order to preserve the direct signal information of the frequency component $f_c$ produced by variations in the ambient atmosphere. The output from this second band pass filter 46 is put into a mixer or multiplier 47 where it is multiplied by the output of the second audio oscillator 43 which has been passed through a frequency doubler 49. Thus, the frequency component $2f_2$ is multiplied by a signal of the same frequency and the same phase. If there is any phase difference between these signals, a phase shifter can be utilized to maintain the signals in phase. The output from this second mixer or multiplier 47 is put through a low pass filter 48 with an upper cutoff frequency of approximately $f_c$ to thereby extract the direct signal corresponding to the amplitude function of frequency $f_c$ produced by variations in the refractive index of the ambient atmosphere.

The $f_2$ frequency component which contains as its amplitude function the quadrature information for the direct signal of frequency $f_c$ is separated from the LFI output by a third band pass filter 56 of frequency range from $f_2-f_c$ to $f_2+f_c$ in order to preserve the quadrature information. The output from this third band pass filter 56 is fed to a third mixer or multiplier 57 and multiplied with the output of the second audio oscillator 43 which produces a signal of the same frequency and phase. The output from this third mixer 57 is put into a third low pass filter 58 with an upper cutoff frequency $f_c$ to thereby obtain a signal in quadrature with the direct signal produced by variations in the refractive index of the ambient atmosphere.

As illustrated in FIG. 9, the first band pass filter 6 has a frequency range of approximately that indicated by band 6'. The second band pass filter 46 has a frequency range of approximately that indicated by band 46'. The third band pass filter 56 has a frequency range of approximately that indicated by band 56'. The first low pass filter 8 has a frequency range approximately that indicated by band 8'. The frequency bands indicated on the graph in FIG. 10 indicate the ranges selected to avoid overlap and thereby permit simple filtering in order to separate out the frequency components from the LFI output.

Analysis of Equation No. 5 indicates that in order to preclude overlap between the measurement information frequency components and the compensation information frequency components in the various frequency domains, the following restrictions on $f_1$, $f_2$, $f_m$ and $f_c$ should be observed where $f_c$ is less than $\frac{1}{2}f_m$.

$$f_1 \geq 3(f_m+f_c)$$

$$\frac{1}{2}(f_1+f_m+f_c) \leq f_2 \leq f_1-f_m-f_c$$

This permits separation of each of the four signals as illustrated in the graph in FIG. 9. If these restrictions on the frequencies are observed, the following frequency ranges are available for the band pass filters. For the first band pass filter 6, $$f_2+f_c < \text{lower cutoff frequency} < f_1-f_m$$

$$f_1+f_m < \text{upper cutoff frequency} < 2f_2-f_c$$

For the second band pass filter 46, $$f_1+f_m < \text{lower cutoff frequency} < 2f_2-f_c$$

$$2f_2+f_c < \text{upper cutoff frequency}$$

For the third band pass filter 56, $$f_m < \text{lower cutoff frequency} < f_2-f_c$$

$$f_2+f_c < \text{upper cutoff frequency} < f_1-f_m$$

As shown in FIG. 10, the direct signal output and its quadrature containing the compensation information may be passed respectively through second wave form shaping circuits 71 and 72 and then together through a directional logic circuit 73 and up-down or reversible counter 74. The output of this second reversible counter may then be processed through a scale factor calculator 75 to a digital multiplier 76 with the output from the first reversible counter thereby appropriately to adjust the measurement information from the first reversible counter to compensate for variations in the refractive index of the ambient atmosphere for subsequent display 77. Such circuitry is well known and need not be described here.

The degree of resolution of the apparatus described herein is in its simplest form one-half the wave length of the operating frequency of the LFI. This resolution is obtained from the original and quadrature signal alone. A small increase in the electronic logic can increase the resolution to one-eighth the wave length of the laser frequency and even more by utilizing an angle resolver 78 to resolve the angle of the sinusoidal output between peaks. Such an angle resolver 78 might be either a servomechanism resolver or a sine-cosine resolver as used in modern analog computers and well known in the art. Such an angle resolver 78 is shown in the data processing diagrams illustrated in FIGS. 7 and 10.

If the index of refraction compensation is not required, the compensation beam can be used as a second measurement beam in which the path length is allowed to vary. This makes possible two LFI's from the same laser provided that the restrictions on the frequency ranges of $f_1$ and $f_2$ heretofore described are followed. The method for this variation is the same as described in the compensation technique with the second external reflector 30 mounted for instance on a suitable displacement carriage for motion in response to a second parameter to be measured.

The LFI described herein is particularly well adapted for applications in fields such as strain seismometry, machine tool screw calibration, machine tool position control, the precision positioning of masks in the manufacture of integrated circuits, etc.

While two embodiments of this invention have been shown and described, it will be apparent that other adaptations and modifications can be made without departing from the true spirit and scope of the invention.

What is claimed is:

1. Apparatus for generating a compensation signal in interferometers of the type having first and second reflector means and a light source providing a beam of light reflected therebetween and wherein the input is a variation in the optical pathlength between the first reflector and second reflector means corresponding to a variation in a parameter to be measured and the interferometer output is a substantially circular function of the input comprising:
   a beam splitter interposed between the first and second reflector means to deflect a portion of the beam away from said second reflector means;
   a third reflector means interposed in the path of said deflected beam whereby said deflected beam detects changes in the refractive index of the ambient atmosphere thereby producing a direct signal output from the interferometer of frequency $f_c$ proportional to the rate of change in the refractive index of the ambient atmosphere;
   means for modulating the deflected beam at a predetermined modulating frequency $f_2$;
   means at the interferometer output for separating the direct signal frequency component of frequency $f_c$ produced by the rate of change of the refractive index of the ambient atmosphere and the modulating frequency component of frequency $f_2$;
   means for demodulating the modulating frequency component to obtain a signal in quadrature with said direct signal produced by the change in the refractive index of the ambient atmosphere.

2. Apparatus for generating a quadrature signal and a compensation signal in interferometers of the type having first and second reflector means and a light providing a light beam reflected therebetween and wherein the input is a variation in the optical pathlength between the first and second reflector means corresponding to a variation in a parameter to be measured and the output from the interferometer is a substantially circular function of the input for uniform changes in the parameter to be measured, said output frequency being proportional to the rate of change of the parameter to be measured and having a maximum frequency value $f_m$ due to the maximum rate of change of the parameter to be measured comprising:
   first modulating means for modulating the input by a perturbation of frequency $f_1$;
   a beam splitter interposed between the first and second reflector means to deflect a portion of the interferometer beam away from said second reflector means;
   a third reflector means interposed in the path of said deflected beam whereby said deflected beam detects changes in the refractive index of the ambient atmosphere thereby producing a direct signal output from the interferometer of frequency $f_c$ proportional to the rate of change in the refractive index of the ambient atmosphere;
   second modulating means for modulating the deflected beam by a perturbiation of frequency $f_2$;
   said frequency $f_m$, $f_1$, $f_c$, and $f_2$ satisfying the following conditions:

$$f_m > 2f_c$$
   $$F_1 \geq 3(f_m + f_c)$$
   $$\tfrac{1}{2}(f_1 + f_m + f_c) \leq f_2 \leq f_1 - f_m - f_c$$

first low pass filter coupled with the interferometer output whereby the original output frequency component of maximum frequency $f_m$ produced by the change in the parameter to be measured is separated, said first low pass filter having the following characteristic approximately:

$$f_m < \text{cutoff frequency} < f_2 - f_c$$

first band pass filter coupled with the interferometer output whereby a frequency band at $f_1$ is separated, said first band pass filter having the following characteristics approximately:

$$f_2 + f_c < \text{lower cutoff frequency} < f_1 - f_m$$
   $$f_1 + f_m < \text{upper cutoff frequency} < 2f_2 - f_c$$

first demodulating means coupled with the output from said first band pass filter whereby a signal in quadrature with said original output signal of maximum frequency $f_m$ is produced;
   second band pass filter coupled with the interferometer output whereby a frequency band at $2f_2$ is separated, said second band pass filter having the following characteristics approximately:

$$f_1 + f_m < \text{lower cutoff frequency} < 2f_2 - f_c$$
   $$2f_2 + f_c < \text{upper cutoff frequency}$$

second demodulating means coupled with the output of said second band pass filter whereby the direct signal of frequency $f_c$ is produced by variations in the refractive index of the ambient atmosphere is obtained;
   third band pass filter coupled with the interferometer output whereby a frequency band at $f_2$ is separated, said third band pass filter having the following characteristics approximately:

$$f_m < \text{lower cutoff frequency} < f_2 - f_c$$
   $$f_2 + f_c < \text{upper cutoff frequency} < f_1 - f_m$$

third demodulating means coupled with the output of said third band pass filter whereby a signal in quadrature with said direct signal of frequency $f_c$ produced by variations in the refractive index of the ambient atmosphere is obtained.

3. Apparatus for generating a quadrature signal and a compensation signal in interferometers as set forth in claim 2 wherein said first demodulating means comprises a first mixer coupled to the output of said first band pass filter multiplying the output with a signal of the same phase and same frequency and a second low pass filter coupled to the output of said first mixer and having an upper cutoff frequency of approximately $f_m$;

and wherein said second demodulating means comprises a second mixer coupled to the output of said second band pass filter multiplying the output with a signal of the same phase and same frequency and a third low pass filter coupled to the output of said second mixer and having an upper cutoff frequency of approximately $f_c$;

and wherein said third demodulating means comprises a third mixer coupled to the output of said third band pass filter multiplying the output with a signal of the same phase and same frequency and a fourth low pass filter coupled to the output of said third mixer and having an upper cutoff frequency of approximately $f_c$.

4. Apparatus for generating a quadrature signal and a compensation signal in interferometers as set forth in claim 2 further provided with:

first wave form shaper means, first directional logic means and first up-down counter means into which are coupled the original output signal produced by variations in the parameter to be measured and the signal in quadrature therewith whereby variations of the parameter in one direction are added and variations in another direction are substracted;

second wave form shaper means, second directional logic means and second up-down counter into which are coupled the direct signal produced by variations in the refractive index of the ambient atmosphere and the signal in quadrature therewith whereby variations in the refractive index in one direction are added and variations in another direction are subtracted;

and scale factor calculator means into which is coupled the output from said second up-down counter whereby a signal corresponding to the ratio of current index of refraction to that when the interferometer was last calibrated is produced;

and digital multiplier means into which is fed the output from the first up-down counter and the output from the scale factor calculator to produce the corrected measurement signal.

5. Apparatus as set forth in claim 2 wherein:

said first modulating means comprises a first piezoelectric crystal upon which the second reflector means is mounted and first oscillator means for applying a periodic voltage across the crystal to thereby cause periodic contraction and expansion of the crystal in a direction normal to the face of the second reflector means at a predetermined modulating frequency $f_1$;

and wherein said second modulating means comprises a second piezoelectric crystal upon which the third reflector means is mounted and second oscillator means for applying a periodic voltage across the crystal to thereby cause periodic contraction and expansion of the crystal in a direction normal to the face of the third reflector means at a predetermined modulating frequency $f_2$.

6. Apparatus for generating a quadrature signal and a compensation signal in interferometers as set forth in claim 2 wherein the amplitude $\Delta Y$ of the perturbation from said second modulating means satisfies the condition that $$\frac{2\pi \Delta Y}{X}$$

is a root of the zero order Bessel function of the first kind where X is one-half the operating wave length of the interferometer.

7. Apparatus for simultaneously measuring two parameters in combination with a laser feedback interferometer of the type having a laser medium, output mirror, first external reflecotr, and photocell detector and means for varying the optical pathlength between the output mirror and first external reflector in response to a variation in a first parameter to be measured, wherein the input due to a variation in the first parameter to be measured is a variation in the optical pathlength between the output mirror and first external reflector and wherein the output from the photocell detector is a substantially circular function of the input, the frequency of said output component due to a change in the first parameter being proportional to the rate of change of the first parameter to be measured and having a maximum value $f_m$ comprising:

first modulating means for modulating the input by a perturbation of frequency $f_1$;

a beam splitter interposed between the first output mirror and first external reflector to deflect a portion of the interferometer beam away from said first external reflector;

a second external reflector interposed in the path of said deflected beam;

means for varying the optical pathlength between said beam splitter and said second external reflector in response to variations in a second parameter to be measured thereby producing a direct signal component in the output of the interferometer of frequency proportional to the rate of change of a second parameter to be measured having a maximum value of frequency $f_c$;

second modulating means for modulating the deflected beam by a perturbation of frequency $f_2$;

said frequencies $f_m$, $f_1$, $f_c$, and $f_2$ satisfying the following conditons:

$f_m > 2f_c$
$f_1 \geq 3(f_m + f_c)$
$\frac{1}{2}(f_1 + f_m + f_c) \leq f_2 \leq f_1 - f_m - f_c$ first low pass filter coupled with the photocell detector output whereby the orignal ouput frequency component of maximum frequency $f_m$ produced by the change in the first parameter to be measured is separated, said first low pass filter having the following characteristic approximately:

$f_m <$ cutoff frequency $< f_2 - f_c$ first band pass filter coupled with the photocell detector output whereby a frequency band at $f_1$ is separated, said first band pass filter having the following characteristics approximately:

$f_2 + f_c <$ lower cutoff frequency $< f_1 - f_m$
$f_1 + f_m <$ upper cutoff frequency $< 2f_2 - f_c$ first demodulating means coupled with the output from said first band pass filter whereby a signal in quadrature with said original output signal of maximum frequency $f_m$ is produced;

second band pass filter coupled with the photocell detector output whereby a frequency band at $2f_2$ is separated, said second band pass fitler having the following characteristics approximately:

$f_1 + f_m <$ lower cutoff frequency $< 2f_2 - f_c$
$2f_2 + f_c <$ upper cutoff frequency second demodulating means coupled with the output of said second band pass filter whereby the direct signal of frequency $f_c$ produced by variations in the second parameter to be measured is obtained;

third band pass filter coupled with the photocell detector output whereby a frequency band at $f_2$ is separated, said third band pass filter having the following characteristics approximately:

$f_m <$ lower cutoff frequency $< f_2 - f_c$
$f_2 + f_c <$ upper cutoff frequency $< f_1 - f_m$ third demodulating means coupled with the output of said third band pass filter whereby a signal in quadrature with said direct signal of frequency $f_c$ produced by variations in the second parameter to be measured is obtained.

8. Apparatus for simultaneously measuring two parameters in combination with a laser feedback interferometer as set forth in claim 7 wherein the amplitude $\Delta Y$ of the perturbation from said second modulating means satisfies the condition that $$\frac{2\pi \Delta Y}{X}$$

is a root of the zero order Bessel function of the first kind, where X is one-half the operating wave length of the laser.

9. Apparatus for generating a quadrature signal in laser feedback interferometers comprising:
   a laser feedback interferometer comprising a laser medium, laser output mirror, external retroreflector in the laser output path, and photodetector for detecting the laser output, all along a common axis wherein the interferometer input is a change in the optical pathlength between the output mirror and external retroflector in proportion to a change in a parameter to be measured and wherein the output is derived from the photodetector;
   means for modulating the input by a perturbation of frequency, $f_1$, at least equal to twice the maximum frequency, $f_m$, of the original output produced by the rate of change in the parameter to be measured;
   means at the output of the transducer for separating the modulating frequency component of the output from the original frequency component of the output produced by the rate of change in the parameter to be measured comprising a first low pass filter coupled with the transducer output having the following characteristic approximately:

$$f_m \leqslant \text{cutoff frequency} < \tfrac{1}{2} f_1$$

and a band pass filter coupled with the transducer output and in parallel with said first low pass filter and having the following characteristics approximately:

$$\tfrac{1}{2} f_1 \leqslant \text{lower cutoff frequency} < f_1 - f_m$$
   $$f_1 + f_m < \text{upper cutoff frequency} \leqslant \tfrac{3}{2} f_1$$

means for demodulating the modulating frequency component after separation from the original output component comprising a mixer coupled with the output of said band pass filter wherein the modulating frequency component is multiplied with an unmodulated signal of the same frequency and same phase to produce carriers of approximately zero frequency and approximately twice the modulating frequency respectively having the same amplitude as the modulating frequency component; and a second low pass filter coupled with the mixer output having the following characteristic approximately:

$$f_m < \text{cutoff frequency} \leqslant \tfrac{1}{2} f_1$$

thereby to produce a signal corersponding to the amplitude function of the modulating frequency component and in quadrature with the original output signal.

10. Apparatus for generating a quadrature signal for circular function transducers as set forth in claim 9 wherein there is also provided in sequence, wave form shaping means, directional logic means and an up-down counter and to which the original output signal and quadrature signal are fed whereby cycles in the original output signal are added for variation of the parameter to be measured in one direction and subtracted for variation of the parameter to be measured in another direction.

References Cited
UNITED STATES PATENTS 3,409,370  11/1968  King et al. _____ 331—94.5
3,409,375  11/1968  Hubbard _____ 356—106

RONALD L. WIBERT, Primary Examiner

C. CLARK, Assistant Examiner

U.S. Cl. X.R.
331—94.5